US010150551B2

(12) United States Patent
Steward et al.

(10) Patent No.: US 10,150,551 B2
(45) Date of Patent: Dec. 11, 2018

(54) TROLLING MOTOR WITH WIND SENSOR

(71) Applicant: NAVICO HOLDING AS, Egersund (NO)

(72) Inventors: Lucas Steward, Broken Arrow, OK (US); Aaron Burton, Tulsa, OK (US); Eirik Hovland, Egersund (NO)

(73) Assignee: NOVICO HOLDING AS, Egersund (NO)

(*) Notice: Subject to any disclaimer, the term of this patent is extended or adjusted under 35 U.S.C. 154(b) by 79 days.

(21) Appl. No.: 15/244,387

(22) Filed: Aug. 23, 2016

(65) Prior Publication Data

US 2018/0057131 A1    Mar. 1, 2018

(51) Int. Cl.
*G01P 5/24* (2006.01)
*B63H 20/00* (2006.01)
*B63H 20/12* (2006.01)
*B63H 21/21* (2006.01)
*B63H 25/04* (2006.01)
*B63J 99/00* (2009.01)

(52) U.S. Cl.
CPC ........... *B63H 21/21* (2013.01); *B63H 20/007* (2013.01); *B63H 20/12* (2013.01); *B63H 25/04* (2013.01); *G01P 5/24* (2013.01); *B63H 2021/216* (2013.01); *B63J 2099/008* (2013.01)

(58) Field of Classification Search
CPC . G01P 5/02; B63H 2021/216; B63J 2099/008
USPC .......................................................... 701/3
See application file for complete search history.

(56) References Cited

U.S. PATENT DOCUMENTS

| 8,381,584 | B1* | 2/2013 | Robinson | B63B 35/00 73/170.01 |
|---|---|---|---|---|
| 9,944,365 | B2* | 4/2018 | Grace | G05D 1/0206 |
| 2004/0015277 | A1* | 1/2004 | Cardoza | B63B 22/18 701/21 |
| 2004/0092179 | A1* | 5/2004 | O'Rourke | B63H 21/21 440/84 |
| 2006/0105647 | A1* | 5/2006 | Yazaki | B63H 21/213 440/53 |
| 2007/0244639 | A1* | 10/2007 | Butterworth | B63H 25/02 701/431 |
| 2009/0105952 | A1* | 4/2009 | Grace | G05D 1/0206 701/300 |
| 2012/0015566 | A1* | 1/2012 | Salmon | B63H 21/21 440/1 |

(Continued)

*Primary Examiner* — Krishnan Ramesh
(74) *Attorney, Agent, or Firm* — Nelson Mullins Riley & Scarborough LLP (57) ABSTRACT

A wind sensor, such as a sonic anemometer, may be utilized to cause a trolling motor to activate to propel a watercraft toward a virtual anchor location, route, or destination, in response to detection of an occurrence or wind. In some instances, the trolling motor may be steered to a direction opposite a wind direction when activated. The trolling motor may also be oriented to a corrective direction based on a comparison of a current location to the virtual anchor location, route, or destination. Propelling the watercraft may also include determining a propulsion correction based on wind speed, wind direction, and/or watercraft characteristics. Depending on the configuration, the wind sensor may be integrated into the housing of the trolling motor.

20 Claims, 8 Drawing Sheets

(56) References Cited

U.S. PATENT DOCUMENTS

2016/0016646 A1* 1/2016 Mun .................... G01C 21/203
  701/21
2017/0284375 A1* 10/2017 Nielsen .................. F03D 17/00

* cited by examiner

TROLLING MOTOR WITH WIND SENSOR

FIELD OF THE INVENTION

Embodiments of the present invention relate generally to trolling motors and, more particularly, to trolling motors including a wind sensor.

BACKGROUND OF THE INVENTION

Trolling motors are often used during fishing or other marine activities. The trolling motors attach to the watercraft (e.g. a fishing boat or kayak) and propel the watercraft along a body of water. For example, trolling motors may provide secondary propulsion or precision maneuvering that can be ideal for fishing activities. The trolling motors, however, may also be utilized for the main propulsion system of watercraft. Further, there are many helpful marine related features, such as navigation, that can be used by operators or users of the watercraft with a trolling motor. In this regard, a trolling motor may be utilized to move to a desired location on a body of water, travel a course from a first location to a second location, or maintain a desired location, among other things. Applicant has developed systems, assemblies, and methods detailed herein to improve capabilities of trolling motors.

BRIEF SUMMARY OF THE INVENTION

Some trolling motors may be configured to maintain a desired location (e.g. a virtual anchor location) or travel to a desired location, such as by autopilot. Typically, a positioning system, such as a global positioning system (GPS), may be utilized in conjunction with the autopilot to activate and/or steer the trolling motor to achieve or maintain the desired location. In some examples, the position sensor may compare a current location to the desired location or a location along a route. The trolling motor may be steered or activated based on a deviation from the desired location or position along the route, such as a predetermined distance.

During windy conditions, a watercraft may drift from a fixed course or virtual anchor location due to the force of wind pushing against the watercraft. The watercraft may be off course or away from the anchor location for a period of time, such as several seconds, before the position sensor can detect the deviation and cause the trolling motor to compensate to steer the watercraft back to the virtual anchor location or route.

In an example embodiment, the trolling motor may include (e.g. house), or be associated with, a wind sensor, such as a sonic anemometer. In some instances, the anemometer may be an ultrasonic wind sensor or an acoustic resonance sensor. The trolling motor may activate in response to the wind sensor detecting wind causing the trolling motor to propel the watercraft in a manner such that it more accurately maintains the virtual anchor location or its heading along the route or to the desired location. In some example embodiments, a wind direction may be determined and the trolling motor steered to propel the watercraft in a direction opposite the wind direction. In an example embodiment, the trolling motor may be activated prior to a determination of a deviation from the desired virtual anchor location or route based on a current position to more rapidly compensate or correct for the detected wind. In some example embodiments, the speed and direction of the trolling motor may be based on a wind force, which may include a wind direction, a wind speed, and one or more watercraft characteristic assumptions. The watercraft characteristic assumptions may include the displacement of the watercraft and/or the geometry of the watercraft.

An example embodiment of the present invention includes a trolling motor for a watercraft, the trolling motor including a motor configured to cause the trolling motor to propel the watercraft when the trolling motor is attached to the watercraft and the motor is submerged. The trolling motor also includes a steering assembly configured to steer the trolling motor in a direction, a wind sensor configured to measure wind data, wherein the wind sensor comprises a sonic anemometer, one or more processors, and a memory including computer program code stored thereon. The computer program code is configured, when executed, to cause the one or more processors to receive an indication of at least one of a virtual anchor location, a route, or a destination. The virtual anchor location is a location that a user of the watercraft desires for the watercraft to maintain. The memory and computer program code are further configured to, with the one or more processors, cause the marine electronic device to receive wind data from the wind sensor indicating the occurrence of wind and in response to receiving the wind data, cause the trolling motor to activate to propel the watercraft toward the virtual anchor location, the route, or the destination.

In an example embodiment, the memory and computer program code are further configured to, with the one or more processors, cause the marine electronic device to compare current location data to the virtual anchor location, route, or the destination determine a corrective direction in which to propel the watercraft from the current location to the virtual anchor location, route, or the destination, and cause the steering assembly to orient the trolling motor to the corrective direction.

In some example embodiments, the memory and computer program code are further configured to, with the one or more processors, cause the marine electronic device to determine a wind direction based on the wind data and cause the steering assembly to orient the trolling motor to a direction opposite the wind direction. In an example embodiment, the memory and computer program code are further configured to, with the one or more processors, cause the marine electronic device to compare current location data to the virtual anchor location, route, or the destination and a current direction of the trolling motor, determine a corrective direction in which to propel the watercraft from the current location to the virtual anchor location, route, or the destination, and cause the steering assembly to orient the trolling motor to the corrective direction.

In some example embodiments, the sonic anemometer includes an ultrasonic anemometer. In an example embodiment, the sonic anemometer includes an acoustic resonance anemometer.

In some example embodiments, the memory and computer program code are further configured to, with the one or more processors, cause the marine electronic device to determine a wind speed based on the wind data and determine a propulsion correction based on the wind speed, wherein the propulsion correction includes a speed for the motor to cause the trolling motor to overcome a wind force. The memory and computer program code are further configured to cause the trolling motor to activate to propel the watercraft is based on the propulsion correction.

In an example embodiment, the memory and computer program code are further configured to, with the one or more processors, cause the marine electronic device to determine a wind speed and a wind direction based on the wind data, determine a wind force based on the wind direction, wind speed, and watercraft characteristics, and determine a propulsion correction based on the wind force, wherein the propulsion correction includes a speed for the motor to drive the trolling motor and a direction for the steering assembly to orient the trolling motor to overcome the wind force. The memory and computer program code are further configured to cause the trolling motor to activate to propel the watercraft is based on the propulsion correction. In some example embodiments, the watercraft characteristics include predetermined assumptions of a geometry of the watercraft or a displacement of the watercraft. In an example embodiment, the trolling motor also includes a control head and the sonic anemometer is mounted to the control head.

The present invention also contemplates propulsion systems and methods of operating a trolling motor, which may include embodiments described herein such as those described above with respect to the example trolling motor.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
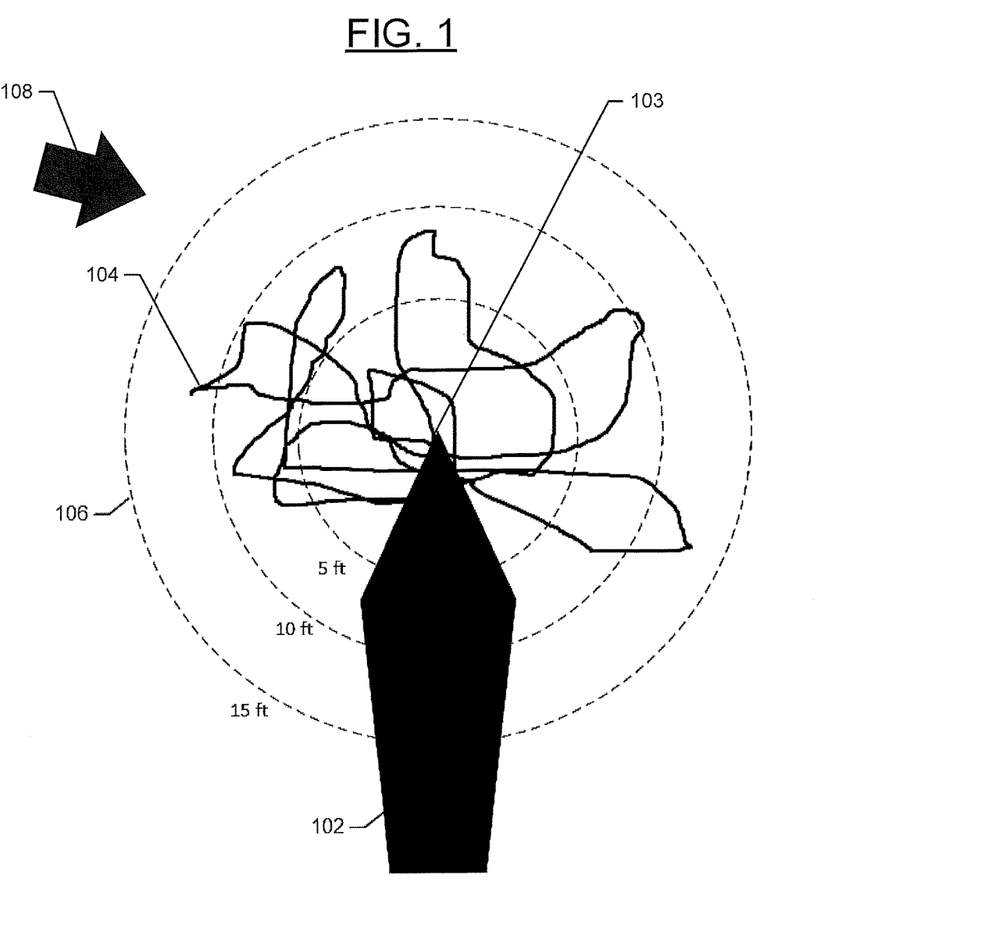
FIG. 1 illustrates a watercraft maintaining a virtual anchor location based on a position sensor, in accordance with some example embodiments discussed herein.

FIG. 1 illustrates a watercraft 102 maintaining a virtual anchor location 103 based on a position sensor in accordance with some embodiments. In some instances, a watercraft 102 may include a navigation system, such as the navigation system 300 discussed below in FIG. 5. The navigation system 300 may include a trolling motor, such as trolling motor 200 discussed below in reference to FIG. 4. Additionally, the navigation system 300 may include a marine electronic device, such as marine electronic device 305 discussed below in reference to FIG. 5, which may be embodied as a portion of the trolling motor 200 or separate from the trolling motor 200.

A virtual anchor location 103 may be a geographical location at which the user desires a portion of the watercraft 102, such as a bow or stern, to achieve or maintain. The virtual anchor location 103 may be selected by designating a location (e.g. a waypoint, a current location, etc.) on a navigational chart displayed on a user interface, entering coordinates on the user interface, or the like.

Environmental factors such, as wind 108, wake, and current may cause the watercraft 102 to drift from the virtual anchor location 103. The marine electronic device 305 may compare a current location from a position sensor, such as a global position from a GPS sensor, to the virtual anchor location 103. In an instance in which a difference between the current location and the virtual anchor location satisfies, e.g. meets or exceeds a predetermined distance threshold, such as 3 ft, 5 ft, or the like, the marine electronic device 305 may cause the trolling motor 200 to activate and propel the watercraft 102 toward the virtual anchor location 103 (thereby returning the watercraft to the virtual anchor location).

Inaccuracies of the current position may cause the watercraft 102 or a portion thereof (e.g. the bow, the stern, where the trolling motor is attached, etc.) to drift substantially from the virtual anchor location 103. As depicted by the trace line 104 the bow of the watercraft may drift to exceed a 5 ft, 10 ft, or even a 15 ft radius 106 of the virtual anchor location 103. In some instances, high accuracy GPS sensors may reduce the drift to less than 5 ft. (as shown by the trace line 104 in FIG. 2).

Figure 2:
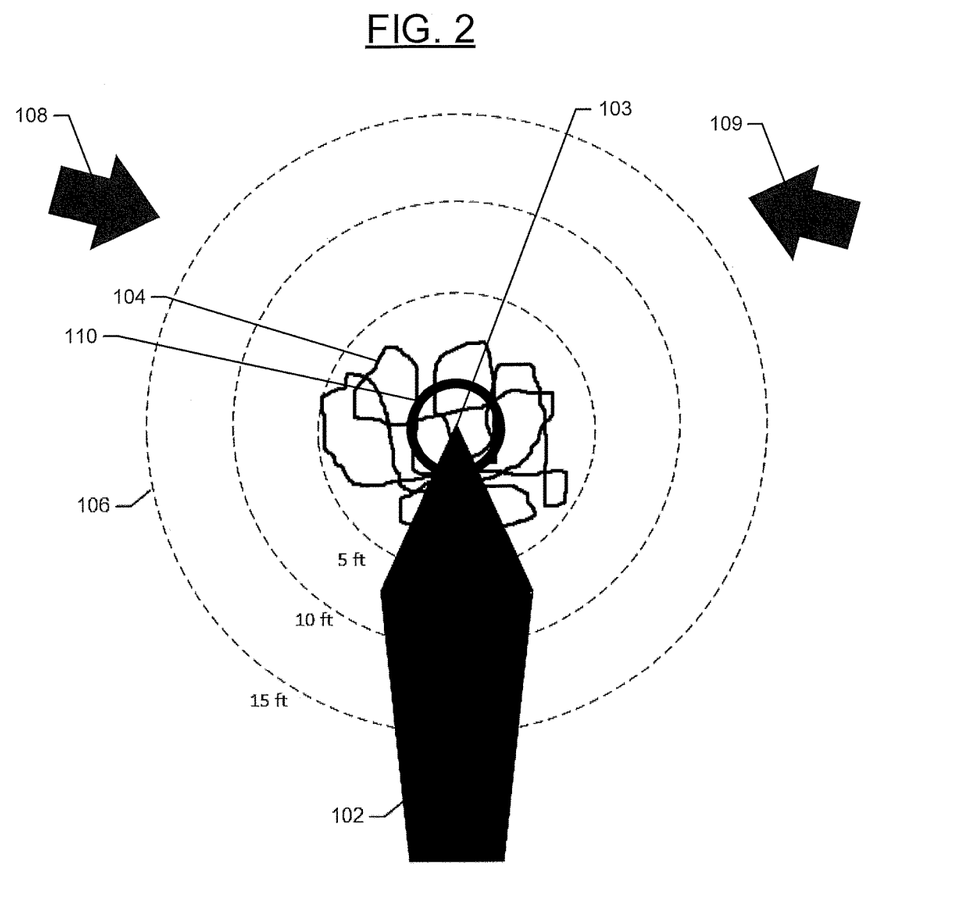
FIG. 2 illustrates a watercraft maintaining a virtual anchor location based on a position sensor and a wind sensor, in accordance with some example embodiments discussed herein.

FIG. 2 illustrates the watercraft 102 maintaining a virtual anchor location 103 based on the position sensor and a wind sensor in accordance with some example embodiments. In an example embodiment, the trolling motor 200 and/or marine electronic device may include or be associated with a wind sensor. The wind sensor may be a sonic wind sensor, such as an ultrasonic anemometer, an acoustic resonance anemometer, or the like. The wind sensor may be configured to measure wind data relating to wind, such as depicted by arrow 108. The wind data may include an indication of an occurrence of wind, e.g. wind or no wind. Additionally or alternatively, the wind data may include a wind speed and/or a wind direction.

In an example embodiment, the marine electronic device 305 may cause the trolling motor to activate, e.g. start the motor, in response to receiving wind data indicative of an occurrence of wind. The trolling motor 200 may be steered, such as to propel the watercraft toward the virtual anchor location 103. The marine electronic device 305 may continue to compare the current location to the virtual anchor location 103 and deactivate the trolling motor when the watercraft 102 or a portion thereof (e.g. the bow of the watercraft) is within the predetermined distance threshold or at the virtual anchor location 103.

In some example embodiments, the wind data may include the wind direction, as indicated by arrow 108. The marine electronic device 305 may cause the trolling motor 200 to be oriented to a direction opposite the wind direction, as depicted by arrow 109. The activation of the trolling motor 200 in the direction opposite the wind direction may counteract the force of the wind on the watercraft 102, which may in turn, reduce drift of the watercraft 102. In some embodiments, the marine electronic device 305 may compare the current location to the virtual anchor location 103 and a current direction of the trolling motor 200 to determine a corrective direction in which to propel the watercraft 102 toward the virtual anchor location 103. The marine electronic device 305 may cause the trolling motor 200 to be oriented to the corrective direction. The marine electronic device 305 may continue to compare the current location to the virtual anchor location 103 and the current direction of the trolling motor 200 as the watercraft 102 is propelled toward the virtual anchor location to update the corrective direction of the trolling motor 200. The marine electronic device 305 may deactivate the trolling motor 200 when the watercraft 102 or a portion thereof (e.g. the bow of the watercraft) is within the predetermined distance threshold or at the virtual anchor location 103.

Additionally or alternatively, the wind data may include the wind direction and a wind speed. The marine electronic device 305 may determine a propulsion correction based on the wind speed. The propulsion correction may include a speed for the motor to cause the trolling motor to overcome a wind force. In some example embodiments, the wind force may be assumed based on the wind speed, a combination of the wind speed and the size of the watercraft 102, or the like. In some example embodiments, the wind force may be determined based on the wind speed and watercraft characteristics, such as geometry of the watercraft 102 and/or displacement of the watercraft 102. For example, wind blowing in a direction from the bow to the stern of the watercraft 102 may have a smaller effect on the drift of the watercraft 102 than wind blowing athwartships, e.g. at a right angle to the fore-and-aft line of the watercraft. Additionally, the angle or shape of the bow or stern, e.g. pointed, rounded, or squared, and/or length of the side of the watercraft facing the wind may also effect the force the wind may apply to the watercraft based on the associated assumptions. Similarly, wind may have a smaller effect on a watercraft which has greater displacement, e.g. weighs more, and/or has a deeper draft. One or more sets of assumptions may be determined based on watercraft types and sizes. The user and or manufacturer may select a set of assumptions by selecting a watercraft from the available watercrafts which is most similar to the watercraft on which the trolling motor 200 is desired to be used.

In an example embodiment, the wind data includes both the wind direction and the wind speed. The marine electronic device 305 may determine the wind force based on the wind direction and the watercraft characteristics. The marine electronic device 305 may determine a propulsion correction including a speed for the motor to drive the trolling motor and a direction to orient the trolling motor to overcome the wind force.

One or more of the methods described above may be utilized to reduce the drift of the watercraft 102. In some instances, the drift of the watercraft may be reduced to a 3 ft radius, a 1 ft radius, or like, as depicted by radius 110.

Figure 3:
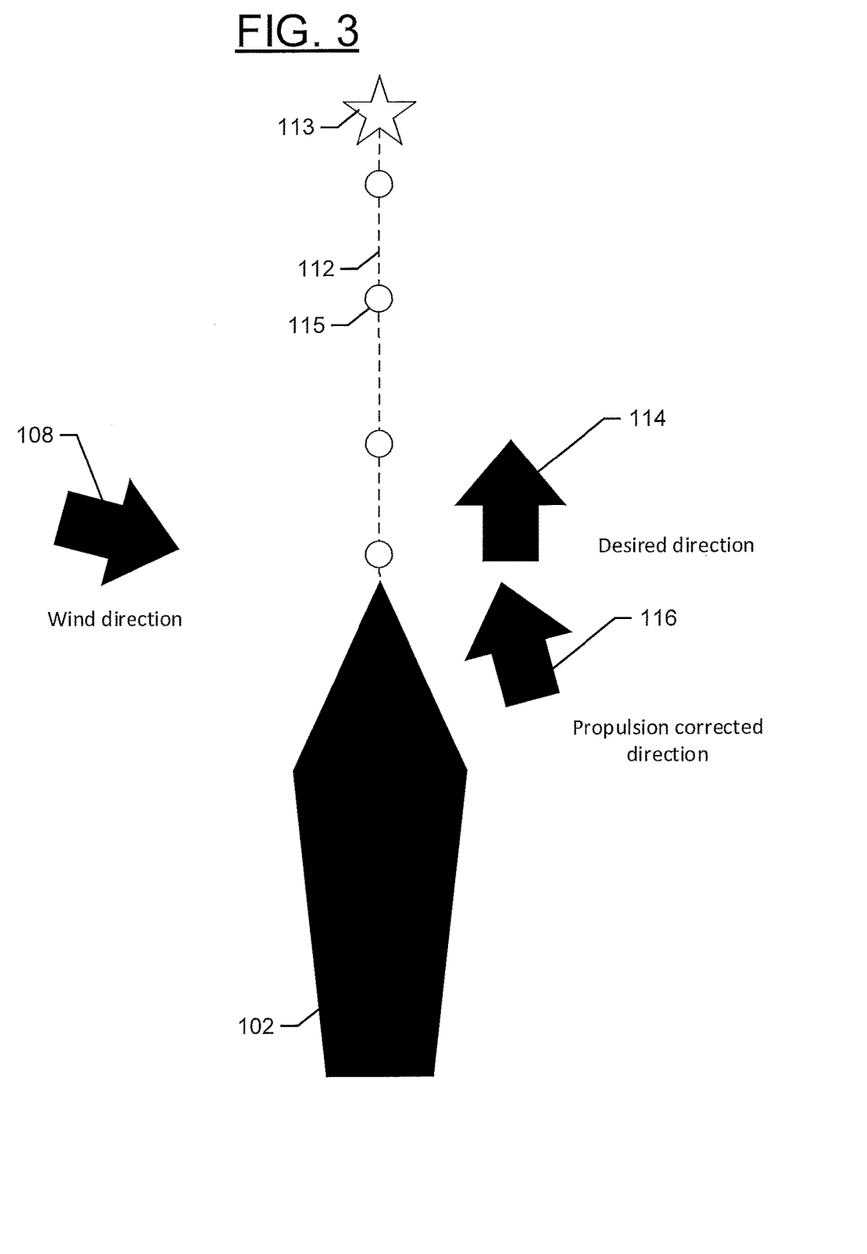
FIG. 3 illustrates a watercraft traveling a route, wherein the watercraft is effected by wind and applies a propulsion correction, in accordance with some example embodiments discussed herein.

FIG. 3 illustrates the watercraft 102 traveling a route including wind and a propulsion correction in accordance with some example embodiments. In some instances, a destination 113 or route may be selected in substantially the same manner as the virtual anchor location 103 discussed above in reference to FIGS. 1 and 2. In some example embodiments, a destination 113 may be selected and the marine electronic device 305 may generate a route 112 from the current location to the destination 113. The route 112 may include a straight line path from the current location to the destination 113 (and/or through intermediate waypoints) or the marine electronic device 305 may determine a path based on avoiding navigational features, such as depth, land, obstacles, or the like.

In some instances, the marine electronic device may receive an indication to travel to the destination 113 or travel the route 112 automatically without user interaction, e.g. through use of an autopilot. The marine electronic device 305 may cause the trolling motor 200 to propel the watercraft towards the destination 113 or along the route 112. In some instances, the route 112 may include a series of waypoints 115. The waypoints 115 may be geographically referenced positions along the route 112 which the marine electronic device 305 propels toward sequentially to reach the desired destination 113 and/or travel the route 112. The marine electronic device 305 may determine a desired direction 114 to orient the trolling motor 200 to propel the watercraft 102 based on a current location and a location of the next waypoint 115 and/or the destination 113.

Environmental conditions, such as wind, wake, current, or the like may cause the watercraft to drift off of the desired route 112 or away from the destination 113. The marine electronic device 305 may activate the trolling motor 200 and/or determine a propulsion correction in a manner substantially similar to the methods described above in reference to FIGS. 1 and 2, substituting the virtual anchor location 103 for the next waypoint 115 or destination 113. FIG. 3 also illustrates an example propulsion corrected direction 116 for orienting the trolling motor 200 based on the desired direction 114 and one or more of a wind occurrence, wind direction, wind speed, watercraft characteristics (such as watercraft geometry and/or watercraft displacement), or the like.

Figure 4A:
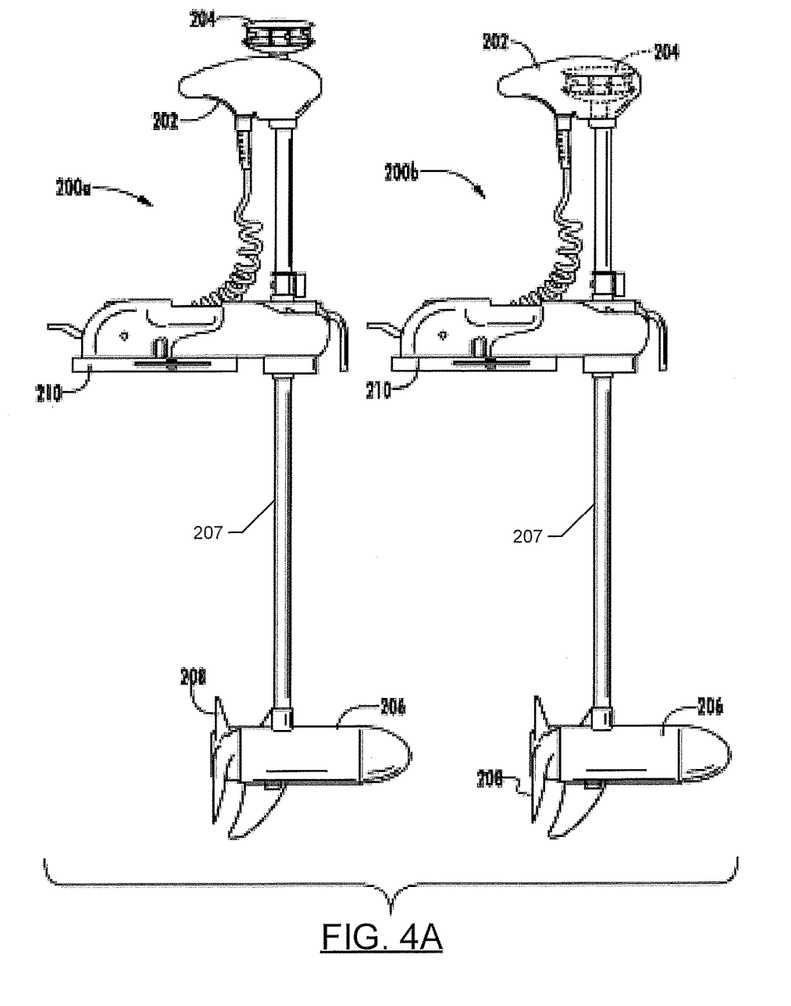
FIG. 4A illustrates example trolling motors including a wind sensor, in accordance with some example embodiments discussed herein.

FIG. 4A illustrates two example trolling motors 200 that each include a wind sensor 204 in accordance with some example embodiments. The trolling motor 200 may include a control head 200, the wind sensor 204, a motor 206, a shaft 207, a propeller 208, and an attachment arm 210. The trolling motor 200 may be attached to or mounted to the watercraft 102 via the attachment arm 210 and the motor 206 may be submerged when in operation. The shaft 207 may be rotatably connected to the attachment arm 210, such that the shaft 207 may be rotated by a steering assembly, manually or electronically, to orient the control head 202 in the desired direction. Manual rotation of the shaft 207 may include hand steering the control head 202, such as by a handle extending from the control head 202, or by a foot petal connected to the control head 202. Electronic rotation of the shaft 207 may include operation of one or more electro-mechanical, hydraulic, or pneumatic actuators to rotate the motor 206 about a shaft 207, which may be actuated by the marine electronic device 305 based on user input and/or the autopilot. The control head 202 (or other portion of the trolling motor) may include at least a portion of control electronics configured to control the motor 206 and/or rotate the shaft 207. The shaft 207 may be rotated to steer the motor 206 to a desired direction to propel the watercraft 102, such as toward the virtual anchor location 103, travel the route 112, or the destination 113. The motor 206 may be an electric motor configured to turn the propeller 208 at a desired speed to propel the watercraft 102.

The wind sensor 204 may be mounted to the trolling motor 200 or to a position on the watercraft 102 which is open to wind. In one example trolling motor 200a, the wind sensor is mounted to the top of the control head 202 of the trolling motor 200a. The mounting of the wind sensor 204 to the top of the control head 202 may be permanent, semi-permanent, or detachable. In another example, the wind sensor 204 may be mounted within the housing of the control head 202. In such an example, there may be one or more openings or vents to allow wind to pass through the control head 202.

Figure 4B:
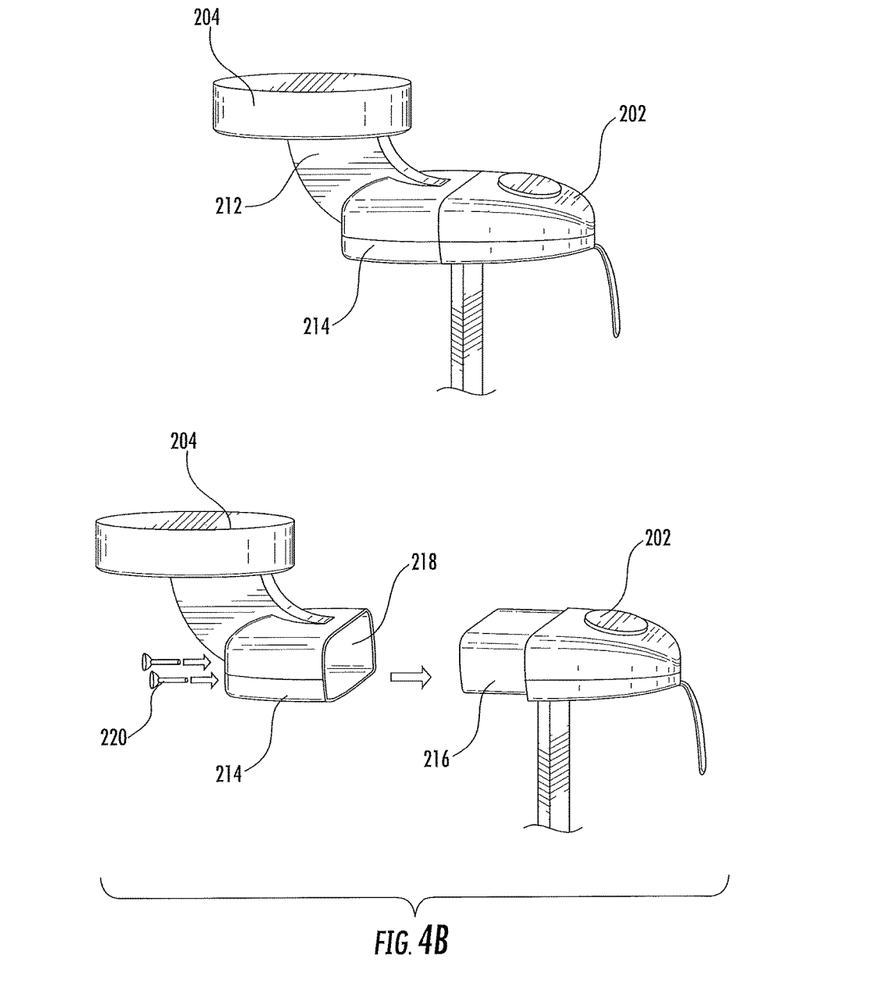
FIGS. 4B and 4C illustrate example mounting assemblies for the wind sensor, in accordance with example embodiments discussed herein.
Figure 4C:
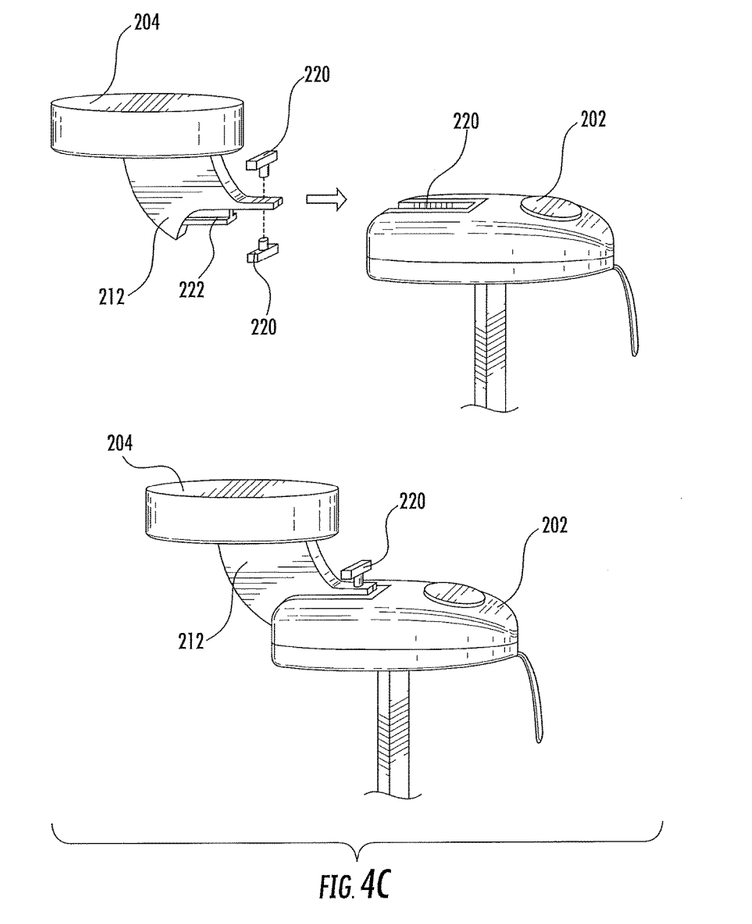

FIGS. 4B and 4C illustrate example embodiments of mounting assemblies for the wind sensor 204. The wind sensor 204 may be positioned at an elevation above the control head 202 by a vertical extension 212. The vertical extension 212 may be connected to the bottom of the wind sensor 204 at a first end and connected to the control head 202 at a second end. In the embodiment depicted in FIG. 4B, the vertical extension 212 includes a receiver boot 216 configured to receive portion 214 of the control head 202. In some embodiments the portion 214 of the control head 202 may be formed to fit within the receiver boot 214, such that the receiver boot 214 will be flush with the exposed portions of the control head 202 when mounted. In an example embodiment, the receiver boot 214 and/or the portion 216 of the control head 202 may include one or more retention elements 218. The retention elements 218 may include protrusions and/or recesses configured to receive the protrusions. The protrusions and/or recesses may be formed perpendicularly to the direction of connection and removal of the receiver boot 214 from the control head 202. Additionally or alternatively, capture elements 220, such as screws, may be used to secure the receiver boot 214 to the control head 202. The capture elements 220 may be disposed along a periphery of the receiver boot 214 and/or at a back portion of the receiver boot 214, as depicted, opposite an opening in the receiver boot 214 for receiving the control head 202.

In the embodiment depicted in FIG. 4C the vertical extension 212 includes a slide connector, such as a T-connector 222. The control head 202 includes a slot receiver 224. The slot receiver 224 may be configured to receive the T-connector 222. The T-connector 222 and slot receiver 224 may be reversed, such that the T-connector 222 is disposed on the control head 202 and the slot receiver 224 is disposed on the second end of the vertical extension 212. Additionally, the T-connector 22 and slot receiver 224 may be formed in any complementary shape, such as a V, circle and slot, or the like. The T-connector 222 and/or the slot receiver 224 may include one or more retention elements 218, as discussed above and/or capture elements. The capture elements 220 may include screws, as depicted in FIG. 4B, or a male and female snap connector, as depicted in FIG. 4C. The male and female snap connector may include a shaft portion and a head portion. The shaft portion may penetrate the T-connector 222 and/or the slot receiver 224 through an aperture, from opposing directions. The female snap connector may receive the male snap connector shaft portion including a tab which may lock into a recess in the female snap connector shaft portion. Alternatively, the female and male snap connector shaft portions may include a male and female threaded fastener.

Example System Architecture

Figure 5:
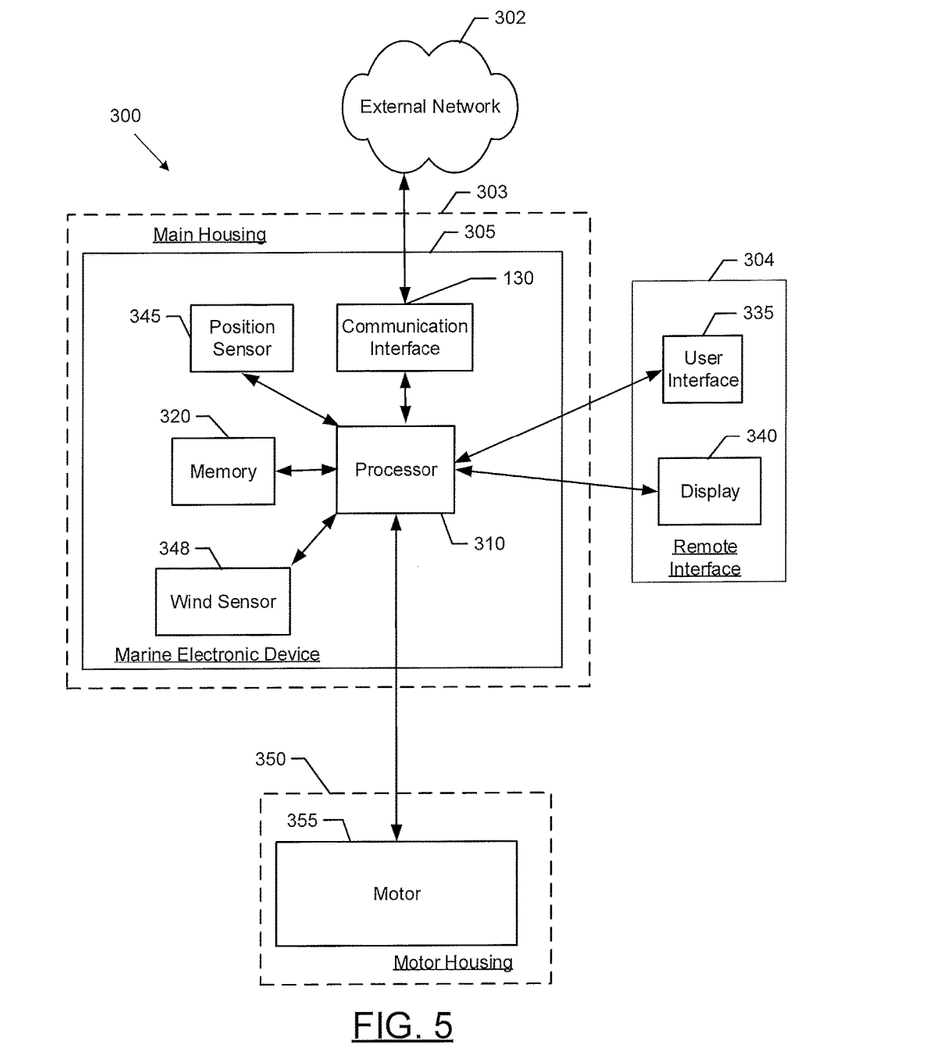
FIG. 5 shows a block diagram illustrating an example navigation system, in accordance with some example embodiments discussed herein.

FIG. 5 shows a block diagram of an example navigation system 300 capable for use with several embodiments of the present invention. As shown, the navigation system 300 may include a number of different modules or components, each of which may comprise any device or means embodied in either hardware, software, or a combination of hardware and software configured to perform one or more corresponding functions. For example, the navigation system 300 may include a main housing 303 (e.g. control head) and a motor housing 350. The motor housing 350 may include a motor 355. The main housing 303 may include or be associated with a marine electronic device 305, for example the marine electronic device 305 may be completely integrated with the control head 303, may be separate and remote from the control head 303, or may be partially integrated (as depicted in FIG. 5), such as the marine electronic device 305 including a remote interface 304 including a user interface 355 and a display 340.

The navigation system 300 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. Numerous other peripheral devices such as one or more wired or wireless multi-function displays (e.g. a marine electronic device 305) may be included in the navigation system 300.

The marine electronic device 305 may include a processor 310, a memory 320, the user interface 335, the display 340, one or more sensors (e.g. position sensor 345, wind sensor 348, orientation sensor (not shown), etc.), and a communication interface 330.

The processor 310 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 310 as described herein. In this regard, the processor 310 may be configured to analyze electrical signals communicated thereto to provide route data for navigation of a vehicle, such as a watercraft. For example, the processor 310 may be configured to receive route data and user input associated with the route data to generate or modify a route for display to a user (e.g. on display 340/user interface 335). Additionally or alternatively, the processor 310 may be configured to activate and steer the trolling motor 350 based on various sensor data.

In some embodiments, the processor 310 may be further configured to implement signal processing or enhancement features to improve the display characteristics or data or images, collect or process additional data, such as time, temperature, GPS information, waypoint designations, wind speed, wind direction, or others, or may filter extraneous data to better analyze the collected data. It may further implement notices and alarms, such as those determined or adjusted by a user, to reflect depth, presence of fish, proximity of other vehicles, e.g. watercraft, etc.

The memory 320 may be configured to store instructions, computer program code, marine data, such as sonar data, chart data, location/position data, and other data associated with the navigation system in a non-transitory computer readable medium for use, such as by the processor.

The communication interface 330 may be configured to enable connection to external systems (e.g. an external network 302). In this manner, the marine electronic device 405 may retrieve stored data from a remote, external server via the external network 402 in addition to or as an alternative to the onboard memory 320.

The position sensor 345 may be configured to determine the current position and/or location of the marine electronic device 305. For example, the position sensor 345 may comprise a GPS, bottom contour, inertial navigation system, such as machined electromagnetic sensor (MEMS), a ring laser gyroscope, or the like, or other location detection system.

The wind sensor 348 may be configured to measure wind data, such as wind speed a direction. The wind sensor 348 may be a sonic wind sensor, such as a sonic anemometer. In an example embodiment, the wind sensor 348 may be an ultrasonic anemometer. In some example embodiments, the wind sensor 348 may be an acoustic resonance anemometer.

The display 340 may be configured to display images and may include or otherwise be in communication with a user interface 335 configured to receive an input from a user. The display 340 may be, for example, a conventional LCD (liquid crystal display), a touch screen display, mobile device, or any other suitable display known in the art upon which images may be displayed.

In any of the embodiments, the display 340 may present one or more sets of marine data (or images generated from the one or more sets of data). Such marine data includes chart data, radar data, weather data, location data, position data, orientation data, sonar data, or any other type of information relevant to the watercraft. In some embodiments, the display 340 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 335 may include, for example, a keyboard, keypad, function keys, mouse, scrolling device, input/output ports, touch screen, or any other mechanism by which a user may interface with the system.

Although the display 340 of FIG. 5 is shown as being directly connected to the processor 310 and within the marine electronic device 305, the display 340 could alternatively be remote from the processor 310 and/or marine electronic device 305. Likewise, in some embodiments, the position sensor 345 and/or user interface 335 could be remote from the marine electronic device 305. Similarly, the trolling motor is depicted remote from the marine electronic device 305, but the processor 310 of the marine electronic device 305 may be directly connected to, or a portion of the trolling motor 350.

The trolling motor 350 may include a motor to drive the trolling motor and a steering assembly to position the trolling motor in a direction. The trolling motor 350 may be substantially similar to the trolling motor 200, as described above in reference to FIG. 4.

Example Flowchart(s) and Operations

Embodiments of the present invention provide methods, apparatus and computer program products for generating or modifying routes for navigation of a watercraft. Various examples of the operations performed in accordance with embodiments of the present invention will now be provided with reference to FIG. 6.

Figure 6:
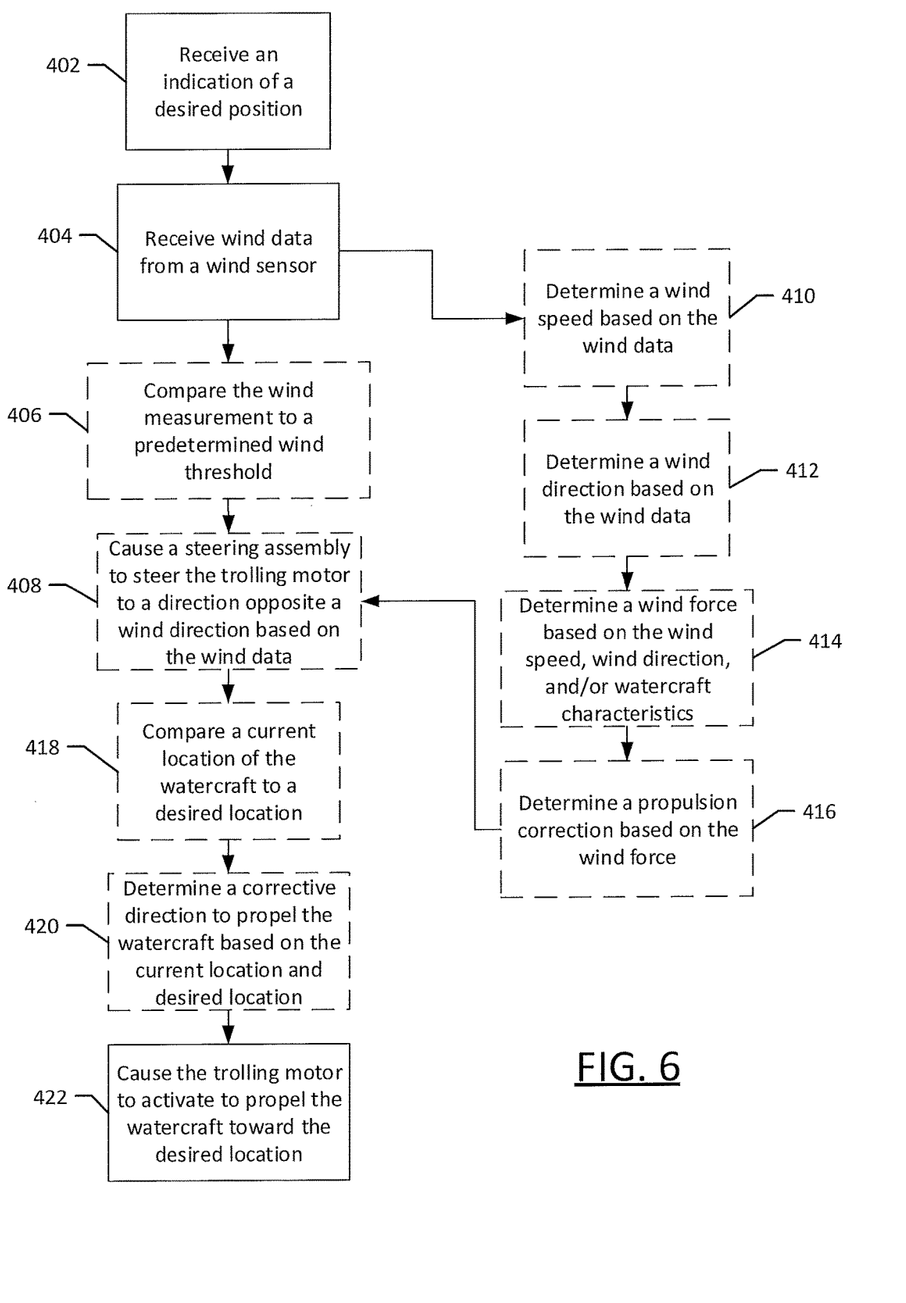
FIG. 6 illustrates a flowchart of example methods of operating a trolling motor with a wind sensor, in accordance with some example embodiments discussed herein.

FIG. 6 illustrates a flowchart according to an example method for actuating and steering a trolling motor with a wind sensor according to an example embodiment. The operations illustrated in and described with respect to FIG. 6 may, for example, be performed by, with the assistance of, and/or under the control of one or more of the processor 310, memory 320, communication interface 330, user interface 335, position sensor 345, wind sensor 348, display 340, and/or trolling motor 350. The method may include receiving an indication of a desired position at operation 402, receiving wind data from a wind sensor at operation 404, and causing the trolling motor to activate to propel the watercraft toward the desired location at operation 422.

In some embodiments, the method may include additional, optional operations, and/or the operations described above may be modified or augmented. Some examples of modifications, optional operations, and augmentations are described below, as indicated by dashed lines, such as, comparing the wind data to a predetermine wind threshold at operation 406, causing a steering assembly to steer the trolling motor to a direction opposite a wind direction based on the wind data at operation 408, determining a wind speed based on the wind data at operation 410, and determining a wind direction based on the wind data at operation 412. In some example embodiments, the method may also include determining a wind force based on the wind speed, wind direction, and/or watercraft characteristics at operation 414, and determining a propulsion correction based on the wind force at operation 416. At operation 418, the method may include comparing a current location of the watercraft to a desired location and, at operation 420 the method may include determining a corrective direction to propel the watercraft based on the current location and desired location.

FIG. 6 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 320 and executed by, for example, the processor 310. As will be appreciated, any such computer program product may be loaded onto a computer or other programmable apparatus (for example, a marine electronic device 305) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 305) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A trolling motor for a watercraft, the trolling motor comprising:
    a motor configured to cause the trolling motor to propel the watercraft when the trolling motor is attached to the watercraft and the motor is submerged;
    a steering assembly configured to steer the trolling motor in a direction;
    a wind sensor configured to measure wind data, wherein the wind sensor comprises a sonic anemometer;
    one or more processors; and
    a memory including computer program code stored thereon, wherein the computer program code is configured, when executed, to cause the one or more processors to:
        receive an indication of a virtual anchor location, wherein the virtual anchor location is a location that a user of the watercraft desires for the watercraft to maintain,
        receive wind data from the wind sensor indicating the occurrence of wind, and
        in response to receiving the wind data, cause the trolling motor to activate to propel the watercraft toward the virtual anchor location.

2. The trolling motor of claim 1, wherein the memory and computer program code are further configured to, with the one or more processors, cause the marine electronic device to:
    compare current location data to the virtual anchor location,
    determine a corrective direction in which to propel the watercraft from the current location to the virtual anchor location; and
    cause the steering assembly to orient the trolling motor to the corrective direction.

3. The trolling motor of claim 1, wherein the memory and computer program code are further configured to, with the one or more processors, cause the marine electronic device to:
    determine a wind direction based on the wind data; and
    cause the steering assembly to orient the trolling motor to a direction opposite the wind direction.

4. The trolling motor of claim 3, wherein the memory and computer program code are further configured to, with the one or more processors, cause the marine electronic device to:
    compare current location data to the virtual anchor location and a current direction of the trolling motor;
    determine a corrective direction in which to propel the watercraft from the current location to the virtual anchor location; and
    cause the steering assembly to orient the trolling motor to the corrective direction.

5. The trolling motor of claim 1, wherein the sonic anemometer comprises an ultrasonic anemometer.

6. The trolling motor of claim 1, wherein the memory and computer program code are further configured to, with the one or more processors, cause the marine electronic device to:
    determine a wind speed based on the wind data; and
    determine a propulsion correction based on the wind speed, wherein the propulsion correction includes a speed for the motor to cause the trolling motor to overcome a wind force,
    wherein causing the trolling motor to activate to propel the watercraft is based on the propulsion correction.

7. The trolling motor of claim 1, wherein the memory and computer program code are further configured to, with the one or more processors, cause the marine electronic device to:
    determine a wind speed and a wind direction based on the wind data;
    determine a wind force based on the wind direction, wind speed, and watercraft characteristics; and
    determine a propulsion correction based on the wind force, wherein the propulsion correction includes a speed for the motor to drive the trolling motor and a direction for the steering assembly to orient the trolling motor to overcome the wind force,
    wherein causing the trolling motor to activate to propel the watercraft is based on the propulsion correction.

8. The trolling motor of claim 7, wherein the watercraft characteristics include predetermined assumptions of a geometry of the watercraft or a displacement of the watercraft.

9. The trolling motor of claim 1 further comprising:
    a control head,
    wherein the sonic anemometer is mounted to the control head.

10. The trolling motor of claim 1, wherein the memory and computer program code are further configured to, with the one or more processors, cause the marine electronic device to:
    receive an indication of at least one of a route or a destination, and in response to receiving the wind data, cause the trolling motor to activate to propel the watercraft toward the route or the destination.

11. A propulsion system for a watercraft comprising:
    a trolling motor comprising:
        a motor configured to cause the trolling motor to propel the watercraft when the trolling motor is attached to the watercraft and the motor is submerged;
        a steering assembly configured to steer the trolling motor in a direction; and
        a wind sensor configured to measure wind data, wherein the wind sensor comprises a sonic anemometer; and
    a marine electronic device including a processor and a memory, the memory including computer program code configured to, with the processor, cause the marine electronic device to:
  receive an indication of a virtual anchor location, wherein the virtual anchor location is a location that a user of the watercraft desires for the watercraft to maintain,
  receive wind data from the wind sensor indicating the occurrence of wind, and
  in response to receiving the wind data, cause the trolling motor to activate to propel the watercraft toward the virtual anchor location.

12. The propulsion system of claim 11, wherein the memory and computer program code are further configured to, with the processor, cause the marine electronic device to:
  compare the current location data to the virtual anchor location,
  determine a corrective direction in which to propel the watercraft from the current location to the virtual anchor location; and
  cause the steering assembly to orient the trolling motor to the corrective direction.

13. The propulsion system of claim 11, wherein the memory and computer program code are further configured to, with the processor, cause the marine electronic device to:
  determine a wind direction based on the wind data; and
  cause the steering assembly to orient the trolling motor to a direction opposite the wind direction.

14. The propulsion system of claim 13, wherein the memory and computer program code are further configured to, with the processor, cause the marine electronic device to:
  compare the current location data to the virtual anchor location and a current direction of the trolling motor;
  determine a corrective direction in which to propel the watercraft from the current location to the virtual anchor location; and
  cause the steering assembly to orient the trolling motor to the corrective direction.

15. The propulsion system of claim 11, wherein the sonic anemometer comprises an acoustic resonance anemometer or an ultrasonic anemometer.

16. The propulsion system of claim 11, wherein the memory and computer program code are further configured to, with the processor, cause the marine electronic device to:
  determine a wind speed based on the wind data; and
  determine a propulsion correction based on the wind speed, wherein the propulsion correction includes a speed for the motor to cause the trolling motor to overcome a wind force,
  wherein causing the trolling motor to propel the watercraft is based on the propulsion correction.

17. The propulsion system of claim 11, wherein the memory and computer program code are further configured to, with the processor, cause the marine electronic device to:
  determine a wind speed and a wind direction based on the wind data;
  determine a wind force based on the wind direction, wind speed, and watercraft characteristics; and
  determine a propulsion correction based on the wind force, wherein the propulsion correction includes a speed for the motor to drive the trolling motor and a direction for the steering assembly to orient the trolling motor to overcome the wind force,
  wherein causing the trolling motor to propel the watercraft is based on the propulsion correction.

18. The propulsion system of claim 11, wherein the watercraft characteristics include predetermined assumptions of a geometry of the watercraft or a displacement of the watercraft.

19. The propulsion system of claim 11, wherein the trolling motor further comprises a control head, and
  wherein the sonic anemometer is mounted to the control head.

20. A method for controlling a trolling motor comprising:
  receiving an indication of a virtual anchor location, wherein the virtual anchor location is a location that a user of a watercraft desires for the watercraft to maintain,
  receiving wind data from a wind sensor indicating the occurrence of wind, wherein the wind sensor comprises a sonic anemometer comprising a portion of the trolling motor, and
  in response to receiving the wind data, causing the trolling motor to activate to propel the watercraft toward the virtual anchor location.

* * * * *

UNITED STATES PATENT AND TRADEMARK OFFICE
CERTIFICATE OF CORRECTION

PATENT NO. : 10,150,551 B2
APPLICATION NO. : 15/244387
DATED : December 11, 2018
INVENTOR(S) : Steward et al.

It is certified that error appears in the above-identified patent and that said Letters Patent is hereby corrected as shown below:

On the Title Page

(73) Assignee: NOVICO HOLDING AS, Egersund (NO)
Should read as:
(73) Assignee: NAVICO HOLDING AS, Egersund (NO)

Signed and Sealed this
Eleventh Day of June, 2019

Andrei Iancu
*Director of the United States Patent and Trademark Office*